United States Patent
Kissner et al.

(10) Patent No.: US 7,310,510 B2
(45) Date of Patent: Dec. 18, 2007

(54) METHOD FOR ASCERTAINING A BILLING TARIFF FOR BILLING FOR A DATA TRANSFER

(75) Inventors: Martin Kissner, Kremmen (DE); Friedrich Koch, München (DE); Hagen Scheibe, Ottobrunn (DE); Jens Schendel, Berlin (DE); Christian Wölkner, Oechsen (DE)

(73) Assignee: Siemens Aktiengesellschaft, Munich (DE)

(*) Notice: Subject to any disclaimer, the term of this patent is extended or adjusted under 35 U.S.C. 154(b) by 253 days.

(21) Appl. No.: 10/901,431

(22) Filed: Jul. 29, 2004

(65) Prior Publication Data

US 2005/0026591 A1 Feb. 3, 2005

(30) Foreign Application Priority Data

Jul. 31, 2003 (EP) .................................. 03090244

(51) Int. Cl.
*H04Q 7/20* (2006.01)
(52) U.S. Cl. .................. 455/406; 455/405; 455/414.1; 455/411
(58) Field of Classification Search ................ 455/403, 455/404.2, 405, 406, 410, 411, 414.1, 414.2, 455/407, 422.1, 445, 461, 433, 432.1, 550.1, 455/560; 370/352, 351, 356; 379/114.01, 379/114.2
See application file for complete search history.

(56) References Cited

U.S. PATENT DOCUMENTS

| | | | | |
|---|---|---|---|---|
| 5,978,673 | A * | 11/1999 | Alperovich et al. | 455/417 |
| 6,480,485 | B1 * | 11/2002 | Kari et al. | 370/352 |
| 6,490,450 | B1 | 12/2002 | Batni et al. | |
| 6,496,689 | B1 * | 12/2002 | Keller et al. | 455/406 |
| 6,496,690 | B1 * | 12/2002 | Cobo et al. | 455/408 |
| 6,516,190 | B1 * | 2/2003 | Linkola | 455/408 |
| 6,564,063 | B1 * | 5/2003 | Mittelstadt | 455/456.1 |
| 6,920,317 | B1 * | 7/2005 | Muhonen | 455/405 |
| 6,975,850 | B1 * | 12/2005 | Hurtta et al. | 455/405 |

(Continued)

FOREIGN PATENT DOCUMENTS

EP 1 223 737 A1 7/2001

OTHER PUBLICATIONS

"The Basic Procedures", GSM System for Mobile Communications Lassay-Les-Chateaux, Europe Media, FR, 1993, Seiten 466-477, XP002047768, Mouly M. et al, no month listed.

*Primary Examiner*—Jean Gelin
(74) *Attorney, Agent, or Firm*—Bell, Boyd & Lloyd

(57) ABSTRACT

A method for ascertaining a billing tariff for billing for a data transfer, where a mobile communication terminal which is involved in the data transfer and has access rights for a data mobile radio network is situated in a visitor mobile radio network. The method involves setup of a data tunnel, used for transferring the data, prompting transfer of an item of location information which relates to the communication terminal from a switching center, temporarily associated with the communication terminal, in the visitor mobile radio network to the network gateway node in the data mobile radio network. The network gateway node transfers the item of location information to a billing system, and the billing system uses the item of location information to establish that the communication terminal is situated in the visitor mobile radio network. Thereupon and the billing system ascertains a billing tariff which is associated with the visitor mobile radio network.

10 Claims, 2 Drawing Sheets

U.S. PATENT DOCUMENTS 6,999,449 B2 * 2/2006 Barna et al. ................. 370/352
2002/0138635 A1 * 9/2002 Redlich et al. ............. 709/229
2002/0174212 A1 11/2002 Casati et al.
2003/0100303 A1 * 5/2003 Armbruster et al. ........ 455/433

* cited by examiner

METHOD FOR ASCERTAINING A BILLING TARIFF FOR BILLING FOR A DATA TRANSFER

CLAIM FOR PRIORITY

This application claims the benefit of priority to European Application No. 03090244.9, filed in the German language on Jul. 31, 2003, the contents of which are hereby incorporated by reference.

TECHNICAL FIELD OF THE INVENTION

The invention relates to a method for ascertaining a billing tariff for billing for a data transfer, and in particular, where a mobile communication terminal which is involved in the data transfer and has access rights for a data mobile radio network is situated in a visitor mobile radio network.

BACKGROUND OF THE INVENTION

In telecommunication networks, telecommunication subscribers are provided with a large number of services. Such services regularly involve data transfers taking place between a service provider (for example a service server) and a service user (for example a communication terminal belonging to a telecommunication subscriber). Such data transfers can be used to transfer, by way of example, film data, audio data, message data, market-price data or similar financial information from a service-providing service computer to the service-using communication terminal. In modern communication networks (which are designed on the basis of GPRS or UMTS specifications, for example), the data are transferred in the form of data packets between the service computer and the communication terminal (packet switched data transfer). Mobile communication terminals (e.g. mobile telephones, personal digital assistants or portable computers with a mobile radio interface) can naturally be operated at various locations and hence in various mobile radio networks while using services.

SUMMARY OF THE INVENTION

The invention discloses a method for ascertaining a billing tariff for billing for a data transfer which (method) takes account of the location of the mobile communication terminal.

In one embodiment of the invention, there is a method for ascertaining a billing tariff for billing for a data transfer, where a mobile communication terminal which is involved in the data transfer and has access rights for a data mobile radio network is situated in a visitor mobile radio network, the method involving setup of a data tunnel, used for transferring the data, from the communication terminal to a network gateway node in the data mobile radio network prompting transfer of an item of location information which relates to the communication terminal from a switching center, temporarily associated with the communication terminal, in the visitor mobile radio network to the network gateway node in the data mobile radio network, the network gateway node transferring the item of location information to a billing system, the billing system using the item of location information to establish that the communication terminal is situated in the visitor mobile radio network, and the billing system ascertaining a billing tariff associated with the visitor mobile radio network. A particular advantage in this context is that the item of location information is transferred to the network gateway node and then to the billing system when the data tunnel is set up. This allows the billing system to ascertain the billing tariff which is to be applied for the communication terminal on the basis of its current location. As soon as data are transferred via the data tunnel, this data transfer can be invoiced to the user of the data transfer using the billing tariff.

In another embodiment of the invention, the method is initiated by the visitor mobile radio network receiving a request message from the communication terminal which relates to the data transfer, a request is sent from the visitor mobile radio network to a central data store regarding that data mobile radio network for which the communication terminal has access rights, and the data tunnel is then set up to the network gateway node in this data mobile radio network. In this case, the visitor mobile radio network advantageously ascertains that data mobile radio network for which the communication terminal has access rights and that data mobile radio network which can therefore be used to implement the data transfer. Such a data mobile radio network for which the communication terminal has access rights may be, by way of example, the communication terminal's home network or else a mobile radio network between whose operator and a user of the communication terminal an appropriate agreement has been made.

In still another embodiment of the invention, the network gateway node transfers the item of location information to an authentication server in the data mobile radio network using an authentication message, and the authentication message is taken as a basis for transferring the item of location information to a service computer gateway. In this case, it is advantageous that the item of location information is transferred using an authentication message which is often transferred between network gateway nodes and authentication servers anyway in data mobile radio networks. This means that no additional message is necessary for transferring the item of location information.

In yet another embodiment of the invention, the authentication message is taken as a basis for transferring the item of location information to a service computer gateway by virtue of the network gateway node transferring the authentication message to the authentication server via the service computer gateway, the transfer involving the service computer gateway reading the item of local information from the authentication message, and the item of location information being stored in the service computer gateway. In this embodiment of the inventive method, the authentication server is advantageously not burdened by additional tasks for processing the item of location information, since the service computer gateway automatically reads the item of location information from the authentication message and stores it.

In still another embodiment of the invention, the service computer gateway monitors the data transfer, and monitoring information ascertained and the item of location information are transferred from the service computer gateway to the billing system. In this case, the billing system is provided with the information which can be used for billing by the service computer gateway.

In another embodiment of the invention, the network gateway node receives a user name and/or a password from the communication terminal, and then allows the authentication message to be transferred to the authentication server, with the authentication message containing the user name and/or the password. In this case, it is advantageously possible for authentication of the data transfer (which authentication is necessary in the data mobile radio network anyway) to be connected to transfer of the item of location information.

Alternatively, the invention may proceed in a manner such that the network gateway node receives from the communication terminal a user name which serves merely as a dummy and/or a password which serves merely as a dummy. This embodiment of the invention allows the item of location information to be transferred to the service computer gateway using the authentication message even when no authentication for the data transfer is required. The use of a user name and/or password which serves merely as a dummy allows the network gateway node to create and transfer an authentication message which is complete in form.

The invention allows the data mobile radio network used to be the home mobile radio network of the communication terminal.

In another embodiment of the invention, the billing system compares the item of location information with stored location information associated with various visitor mobile radio networks, and a match between the item of location information and one of the stored items of location information allows the billing system to establish that the communication terminal is situated in the associated visitor mobile radio network. In this context, a simple comparison between the item of location information and the stored location information makes it possible to ascertain precisely the visitor mobile radio network in which the mobile communication terminal is currently situated.

In line with the invention, the method allows the switching center, temporarily associated with the communication terminal, in the visitor mobile radio network to transfer to the network gateway node, as an item of location information, a switching center address which clearly identifies the switching center. In this context, an item of information (switching center address) which is present in the visitor mobile radio network anyway is advantageously used as the item of location information, which results in a method which is particularly easy to implement.

In still another embodiment of the invention, the switching center which is temporarily associated with the communication terminal additionally transfers a parameter for the data transfer to the billing system, and this parameter is used when ascertaining the billing tariff. This advantageously makes it possible to use various billing tariffs which are associated with the data transfer using quantitative features (parameters).

The parameter for the data transfer which is transferred to the billing system may be a bandwidth parameter for the air interface of the communication terminal.

BRIEF DESCRIPTION OF THE DRAWINGS

The invention is explained in more detail below with reference to the drawings, in which.

DETAILED DESCRIPTION OF THE INVENTION

Figure 1:
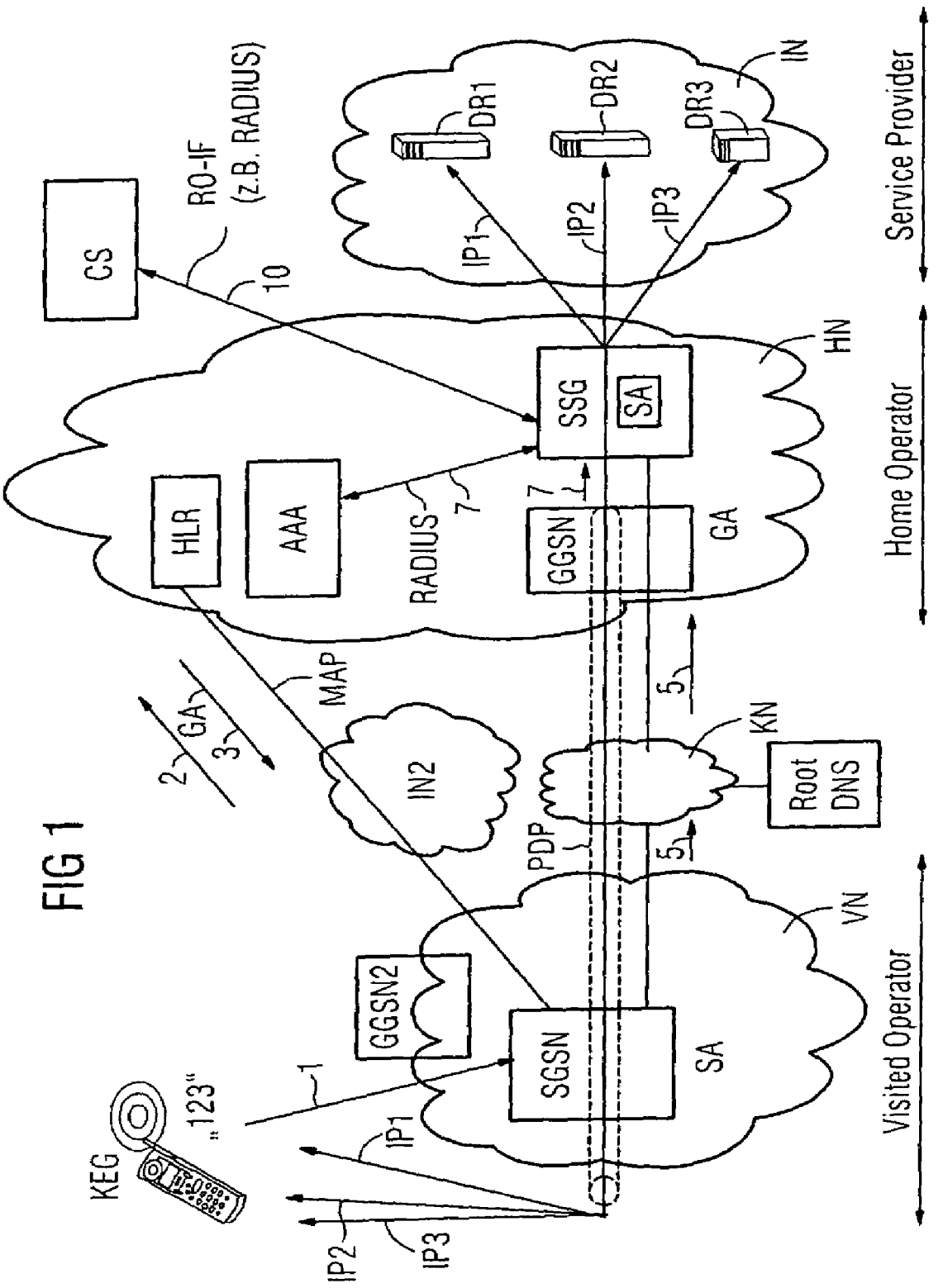
FIG. 1 shows an exemplary embodiment of telecommunication networks involved in a data transfer in accordance with the present invention.

FIG. 1 shows a mobile telecommunication terminal KEG in the form of a mobile telephone with the mobile radio telephone number "123", which terminal is currently situated in the radio area of a visitor mobile radio network VN and is connected thereto. The visitor mobile radio network VN is subject to the control of a visitor network operator ("visited operator"). The communication terminal KEG is intended to be used to make use of a service on a service computer DR2, the service computer DR2 being arranged on the Internet IN. The service computer DR2 is subject to the control of a service provider. The communication terminal KEG accesses the service computer DR2 on the Internet IN using the visitor mobile radio network VN, using a further telecommunication network KN and using a data mobile radio network HN. The data mobile radio network HN is, in general terms, a mobile radio network for which the communication terminal KEG has access rights and which is therefore used to effect the service use or the access to the data on the service computer DR2.

This service use involves data packets IP2 being interchanged between the communication terminal KEG and the service computer DR2. The transfer of such IP data packets designed on the basis of the Internet Protocol (IP) implements bidirectional data transfer between the communication terminal KEG and the data mobile radio network HN or the service computer DR2.

The communication terminal KEG may also simultaneously use a further service on a further service computer DR1 and/or a third service on a third service computer DR3. To this end, data packets IP1 can be interchanged bidirectionally between the communication terminal KEG and the further service computer DR1. Similarly, data packets IP3 can be interchanged bidirectionally between the communication terminal KEG and the third service computer DR3.

Services which the mobile communication terminal accesses by transferring data in data packets are also referred to as "IP services". Such services are provided for the user of the communication terminal KEG by his home mobile radio network HN (mobile network operator core network). In the exemplary embodiment, this is done by virtue of the home network HN conveying access to the service computer DR2 on the Internet. In the exemplary embodiment, the data mobile radio network HN as the home mobile radio network is subject to the control of a home network operator ("home operator"). In another exemplary embodiment, the service computer DR2 may of course also be arranged within the home network HN.

In another exemplary embodiment, the case may also arise that a user of the communication terminal KEG and a network operator in a third mobile radio network (which differs from the home mobile radio network of this communication terminal KEG) sign an agreement allowing the communication terminal KEG to access this third mobile radio network in order to use services via the third mobile radio network. In this case, "APN (Access Point Name) settings" in the communication terminal KEG are altered such that the communication terminal KEG is able to access a network gateway node in this third mobile radio network. In this case, this third mobile radio network behaves in a similar manner to the home network of the communication terminal in terms of service use; this is because the third mobile radio network allows the communication terminal KEG to transfer data using the respective service computer.

The mobile radio network which the roaming mobile radio subscriber is able to access and for which he has access rights is referred to within the context of this description as the data mobile radio network. This data mobile radio network may thus be either the home mobile radio network of the communication terminal or a third mobile radio network which the communication terminal is able to access for the purpose of service use.

Connected to the data mobile radio network HN is a billing system CS which is used to bill for the data transfer. This means that a user of the communication terminal KEG can be invoiced for this data transfer. For this purpose, the billing system CS holds various billing tariffs which can be applied in line with the type of the respective data transfer. The billing system CS stores, by way of example, a billing tariff which can be applied when the mobile communication terminal KEG is situated in the sphere of influence of the visitor mobile radio network VN (i.e. "is roaming" therein). For further visitor mobile radio networks (into whose sphere of influence the mobile communication terminal might likewise enter and from where the communication terminal might likewise set up data transfers to the data mobile radio network), which are not shown in the figure, the billing system CS likewise stores associated billing tariffs. By way of example, such billing tariffs contain price data to be applied to the respective data transfer (e.g. one minute of data transfer costs Euro 0.30, 10 Kbyte of transferred data volume costs Euro 1, a data record transferred entirely using data packets costs Euro 3).

The text below explains how the billing tariff currently to be applied is ascertained in the billing system CS. If, for the purpose of service use, the mobile communication terminal KEG is used to access the service computer DR2 and a corresponding data transfer is to be implemented between the communication terminal and the service computer DR2, then the communication terminal KEG sends a request message relating to the data transfer to the visitor mobile radio network VN (arrow 1). This request message is sent to a switching center SGSN (Serving GPRS Support Node) in the visitor mobile radio network VN. The switching center SGSN then asks a central data store in the form of a home location register HLR for which data mobile radio network the communication terminal KEG has access rights (arrow 2). In the exemplary embodiment, this request is made via a further Internet IN2 using MAP messages. The home location register HLR stores information for each subscriber relating to their access rights in the form of a data record "GPRS Subscription Data" (in GPRS or UMTS mobile radio networks, the central data store used may also be a storage node HSS). The home location register HLR uses the MAP message "Insert Subscriber" to transfer a gateway address GA for a network gateway node GGSN in the data mobile radio network HN to the switching center SGSN (arrow 3). A data tunnel PDP (Packet Data Protocol) in the form of a "PDP context" is then set up to implement the data transfer between the communication terminal and the network gateway node GGSN in the data mobile radio network. While the data tunnel PDP is being set up, the mobile communication terminal sends a user name and/or a password to the network gateway node GGSN. This user name and/or password may be a user name and/or a password which is provided for the purpose of authenticating the data transfer. Alternatively, it may also be a user name and/or password which serves merely as a dummy and whose content is arbitrary and has no significance whatsoever. In this case, a user name and/or password in such a form is advantageously used to provide the network gateway node GGSN with the option of creating an authentication message even when authentication is not actually required taking into account security aspects.

When the data tunnel PDP is set up, an item of location information relating to the communication terminal is likewise transferred to the network gateway node GGSN in the form of a switching center address SA which clearly identifies the switching center SGSN. This switching center address SA represents an item of location information for the communication terminal KEG, because the mobile communication terminal KEG is currently situated in the local area of influence of this switching center SGSN; the switching center SGSN is therefore the switching center temporarily associated with the communication terminal in the visitor mobile radio network. Transfer of the item of location information SA and of the user name and/or of the password is symbolized by the arrows 5. In the exemplary embodiment, these data are transferred to the network gateway node GGSN via the further telecommunication network KN. The further telecommunication network KN in the exemplary embodiment is an "inter-PLMN backbone", to which an inherently known address translator in the form of a "root domain name server" (root DNS) is connected. This domain name server undertakes address translation for the switching center address SA between its numerical and symbolic forms in a known manner. In the exemplary embodiment, the switching center address SA is in the form of an IP address. However, the invention also permits any other information to be transferred as location information to the network gateway node in the data mobile radio network, e.g. a country code for the country in which the communication terminal KEG is currently situated or an identity (cell ID) for that radio cell in the in the visitor mobile radio network VN in whose radio coverage area the communication terminal KEG is currently situated.

When the network gateway node GGSN has received the user name, the password and the item of location information, the network gateway node GGSN creates an authentication message which contains the user name, the password and the item of location information. This authentication message is transferred from the network gateway node GGSN to an authentication server AAA via a service computer gateway SSG. As an authentication message of this type, an "Access Request" message designed on the basis of the RADIUS protocol is used (arrow 7). The service computer gateway SSG is that network node in the data mobile radio network HN which can set up a connection to the service computer which provides the respective service (in the exemplary embodiment, to the service computer DR on the Internet).

The service computer gateway SSG reads the item of location information SA from the authentication message 7 and buffer-stores it for the duration of the data transfer. (In one alternative embodiment, the item of location information SA is transferred to the authentication server AAA using the authentication message, is read from the authentication message by this authentication server AAA and is then transmitted from the authentication server AAA to the service computer gateway SSG. The item of location information SA is then buffer-stored by the service computer gateway SSG.)

The service computer gateway SSG now monitors the data transfer between the communication terminal KEG and the service computer DR2; by way of example, the service computer gateway SSG ascertains the number and/or the data volume of the data packets IP2 which are interchanged between the communication terminal KEG and the service computer DR2. The service computer gateway SSG sends the information ascertained in this way to the billing system CS as monitoring information together with the stored item of location information SA. Such monitoring information may be transferred, by way of example, using billing messages "Accounting Start" and "Accounting Stop" designed on the basis of the RADIUS protocol (arrow 10). These messages are transferred from the service computer gateway SSG to the billing system CS at the start and at the end of the data transfer for which billing is to be performed. In this case, the data transfer between the service computer gateway SSG and the billing system CS takes place via the inherently known "RO interface" RO-IF; in this way, billing for the data transfers in the current "session" (data transfer) is prepared. The billing system CS now uses the item of location information SA to establish that the communication terminal KEG is situated in the visitor mobile radio network VN. To this end, the billing system compares the item of location information SA with stored items of location information associated with various visitor mobile radio networks. In the exemplary embodiment, the billing system CS stores that the switching center address SA is associated with the visitor mobile radio network VN. From this stored item of location information, the billing system CS identifies that the communication terminal KEG is situated in the sphere of influence of the visitor mobile radio network VN. Next, the billing system CS ascertains the billing tariff associated with the visitor mobile radio network VN and uses it for subsequently billing for the data transfer. This billing tariff may, by way of example, have higher billing charges than a billing tariff which would be applied if the communication terminal KEG were situated in the radio coverage area of the data mobile radio network HN or were connected directly thereto (i.e. if the communication terminal KEG is not "roaming", but rather is situated in the sphere of influence of its home network, for example).

Whenever a billing message 10 is sent, the service computer gateway SSG inserts the item of location information SA into the billing message, so that the billing system CS can continually check whether the communication terminal KEG is still in the visitor mobile radio network VN.

Alternatively, the switching center SGSN temporarily associated with the communication terminal can additionally transfer a parameter for the data transfer to the data mobile radio network HN and to the billing system CS besides the switching center address SA when the data tunnel PDP is set up. As a parameter of this type, it is possible to transfer, by way of example, an item of information about the bandwidth of the air interface of the mobile telephone KEG. This is particularly advantageous in UMTS mobile radio networks, since in these networks various data transfer rates (bandwidths) are used depending on the direction of the data transferred. This additional parameter for the data transfer can also be used by the billing system CS when ascertaining the billing tariff.

In another alternative embodiment of the method, the service computer gateway SSG can produce "charging tickets", which are then transferred to a billing system in the form of a postpaid system. When producing these tickets, the service computer gateway SSG uses a billing tariff. To ascertain the billing tariff, the service computer gateway SSG can use the item of location information which it received from the network gateway node GGSN.

Figure 2:
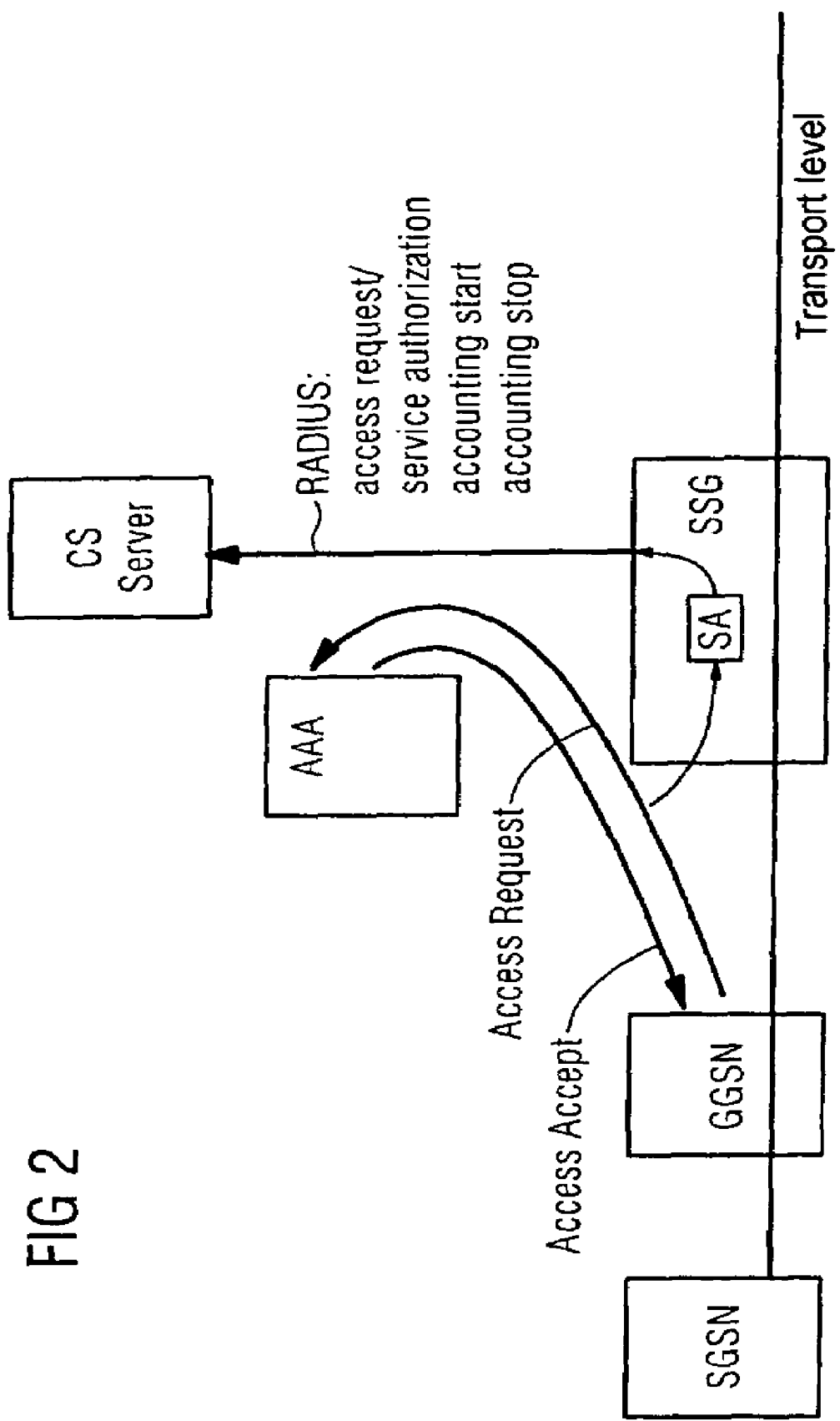
FIG. 2 shows an exemplary embodiment of message transfers between a network gateway node and an authentication server.

FIG. 2 clearly shows how the network gateway node GGSN uses the authentication message "Access Request" to transfer the switching center address SA to the authentication server AAA. The service computer gateway SSG reads this switching center address SA from the authentication message and buffer-stores this switching center address SA so as to transmit it later to the billing system CS together with the monitoring information as part of the "Access Request" and "Service Authorization" actions performed on the basis of RADIUS specifications. The authentication server AAA responds to the authentication message "Access Request" with the message "Access Accept".

The method described can be used to ascertain a billing tariff for billing for an IP packet oriented or packet switched data transfer taking into account whether the mobile communication terminal is situated (roaming) in a visitor mobile radio network.

This method advantageously involves the use of no functionalities of the CAMEL3 standard whatsoever, in particular. This is a considerable advantage, since many network operators currently do not provide or use the functionalities of CAMEL3 in their mobile radio networks for reasons of cost and involvement. With the solution described, the fact that a mobile communication terminal is situated in a visitor mobile radio network when using packet based services can also be identified for mobile radio networks which do not support the functionalities of the CAMEL standard; a billing tariff associated with this visitor mobile radio network for billing for service use or the associated data transfer can be ascertained. The billing tariff can be ascertained in this way in real time, so that the subsequent billing can also be performed using prepaid credits (prepaid methods), for example. In this context, the method described can advantageously be carried out by transferring messages designed on the basis of RADIUS specifications.

Abbreviations used:

| | |
|---|---|
| CAMEL | Cusotmized Applications for Mobile network Enhanced Logic |
| GGSN | Gateway GPRS Support Node |
| GPRS | General Packet Radio Service |
| HLR | Home Location Register |
| HSS | Home Subscriber Server |
| MAP | Mobile Application Part |
| PLMN | Public Land Mobile Network |
| PDP | Packet Data Protocol, e.g. IP protocol |
| SGSN | Serving GPRS Support Node |
| SSG | Service Selection Gateway |
| EMTS | Universal Mobile Telecommunication System |

What is claimed is:

1. A method for ascertaining a billing tariff for billing for a data transfer, where a mobile communication terminal which is involved in the data transfer and has access rights for a data mobile radio network is situated in a visitor mobile radio network, comprising:

setting up a data tunnel, used for transferring the data, from the communication terminal to a network gateway node in the data mobile radio network prompting transfer of an item of location information which relates to the communication terminal from a switching center, temporarily associated with the communication terminal, in the visitor mobile radio network to the network gateway node in the data mobile radio network;

transferring the item of location information to a billing system;

using the item of location information to establish that the communication terminal is situated in the visitor mobile radio network; and ascertaining a billing tariff associated with the visitor mobile radio network, wherein the method is initiated by the visitor mobile radio network receiving a request message from the communication terminal which relates to the data transfer, a request is sent from the visitor mobile radio network to the central data store regarding the data mobile radio network for which the communication terminal has access rights, the data tunnel is set up to the network gateway node in the data mobile radio network, the network gateway node transfers the item of location information to an authentication server in the data mobile radio network using an authentication message, and the authentication message is taken as a basis for transferring the item of location information to a service computer gateway.

2. The method as claimed in claim 1, wherein the network gateway node transfers the authentication message to the authentication server via the service computer gateway;

the transfer involves the service computer gateway reading the item of location information from the authentication message; and the item of location information is stored in the service computer gateway.

3. The method as claimed in claim 1, wherein the service computer gateway monitors the data transfer; and monitoring information ascertained and the item of location information are transferred from the service computer gateway to the billing system.

4. The method as claimed in claim 1, wherein the network gateway node receives a user name and/or a password from the communication terminal; and the authentication message is transferred to the authentication server, the authentication message containing the user name and/or the password.

5. The method as claimed in claim 4, wherein the network gateway node receives from the communication terminal a user name which serves merely as a dummy and/or a password which serves as a dummy.

6. The method as claimed in claim 1, wherein the data mobile radio network used is the home mobile radio network of the communication terminal.

7. The method as claimed in claim 1, wherein the billing system compares the item of location information with stored location information associated with various visitor mobile radio networks; and a match between the item of location information and one of the stored items of location information prompts the billing system to establish that the communication terminal is situated in the associated visitor mobile radio network.

8. The method as claimed in claim 1, wherein the switching center transfers to the network gateway node, as an item of location information, a switching center address which identifies the switching center.

9. The method as claimed in claim 1, wherein the switching center additionally transfers a parameter for the data transfer to the billing system, and the parameter is used when ascertaining the billing tariff.

10. The method as claimed in claim 9, wherein the parameter for the data transfer which is transferred to the billing system is a bandwidth parameter for the air interface of the communication terminal.

* * * * *